No. 619,205. Patented Feb. 7, 1899.
G. W. MORRIS.
REIN GUIDE.
(Application filed Jan. 14, 1898.)
(No Model.)
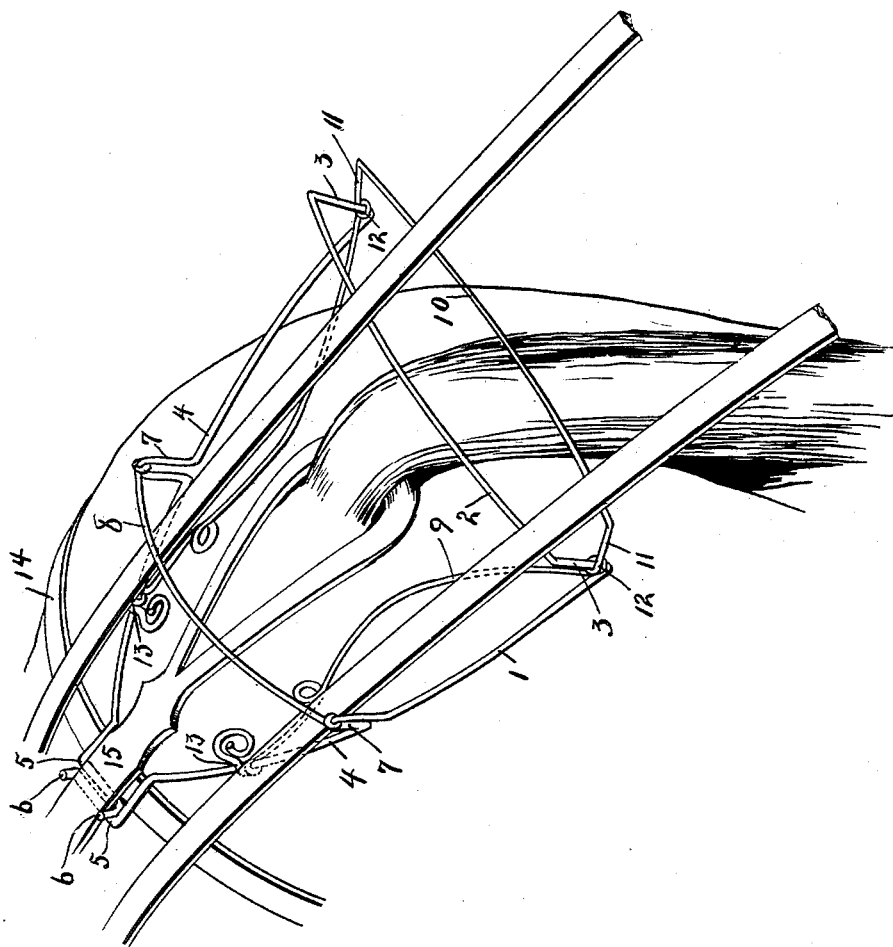

UNITED STATES PATENT OFFICE.

GEORGE W. MORRIS, OF AROMA, INDIANA.

REIN-GUIDE.

SPECIFICATION forming part of Letters Patent No. 619,205, dated February 7, 1899.

Application filed January 14, 1898. Serial No. 666,608. (No model.)

*To all whom it may concern:*

Be it known that I, GEORGE W. MORRIS, a citizen of the United States, residing at Aroma, in the county of Hamilton and State of Indiana, have invented a new and useful Rein-Support, of which the following is a specification.

My invention relates to an improvement in rein-supports.

The object of my invention is to produce a rein-support which may be easily attached to any harness, which may be easily and quickly adjusted to fit any horse, and which will so support the reins as to render it absolutely impossible for a horse to get his tail over them.

The accompanying drawing illustrates my invention.

In the drawing, 1 indicates a single piece of wire, which is bent in the following manner: The middle portion is slightly arched to form the arch 2. The ends are then bent down, so as to form the uprights 3 3, one at each end of the arch 2, then bent forward at substantially right angles to the uprights 3 3, and brought gradually together to form the side pieces 4 4. The forward ends of sides 4 are made substantially parallel and then bent toward each other and at right angles to themselves to form the portions 5 5 and the extreme ends bent up to form the fingers 6 6, which stand substantially vertically at right angles to the portions 5. At about the middle of each side 4 the wire is doubled upon itself, so as to form the uprights 7 7, the upper ends of which are connected by wire 8.

In order to form a wider bearing for the support upon the hips of the horse, I provide a second wire 9. This wire is bent so as to form of its middle an arch 10 similar in shape to the arch 2. The ends of wire 9 are bent to form the arms 11 11 and each twisted loosely about one of the uprights 3, so as to form eyes 12 12. Each end of the wire 9 is then brought forward in substantially the form shown and the ends twisted loosely about the sides 4, near the forward ends thereof, so as to form the eyes 13 13.

To attach the support, the forward ends of sides 4 are slightly separated, the said forward ends resting upon the hip-strap 14 of the harness and the portions 5 passed beneath the back-strap 15 from opposite sides, the said back-strap being embraced between the fingers 6. The support then rests upon the hips of the horse, and in order to make it conform to the shape thereof the sides 4 may be bent into any desired position. The wire 9 may also be bent into any form, the eyes 13 13 slipping along the sides 4 in either direction. The reins are then passed beneath the wire 8 and back over the arches 2 and 10, which arches lie somewhat to the rear of the horse's tail, so that the tail may be free to move in the usual manner. In case the tail rises beneath the support and comes in contact with the arch 10 the said arch rises and then falls immediately back to place, the eyes 12 being free to move upon the uprights 3.

It will be noticed that the device may be easily and quickly attached to any harness, since no special attachments are required, the portions 5 and fingers 6 passing beneath and embracing the back-strap of any harness.

I claim as my invention—

1. A rein-support consisting of a four-sided frame provided with fingers at its open side adapted to pass beneath and embrace the back-strap of a harness, the said frame passing to the rear and forming a support for the reins.

2. A rein-support consisting of a piece of wire bent to form the arch 2, the side pieces 4, 4, portions 5, 5, and the fingers 6, 6, the said portions 5, 5 being adapted to pass beneath the back-strap of a harness from opposite sides and the fingers 6, 6 being adapted to engage the opposite edges of the said back-strap.

3. A rein-support consisting of a wire bent to form the arch 2, the uprights 3, 3, the side pieces 4, 4, and the fingers 6, 6; and a second wire bent to form the arch 10, the eyes 12, 12, embracing the uprights 3, 3, and the eyes 13, 13, embracing the sides 4, 4, substantially as described.

GEORGE W. MORRIS.

Witnesses:
   CASSIUS M. GREENLEE,
   A. KATE MAY.